US008625488B1

(12) United States Patent
Gogate et al.

(10) Patent No.: US 8,625,488 B1
(45) Date of Patent: Jan. 7, 2014

(54) EMBEDDED ACCESS POINT

(75) Inventors: Shantanu Arun Gogate, Erandwane (IN); Rajesh Shreeram Bhagwat, San Jose, CA (US); Sandesh Goel, Noida (IN); Kaustubh Shrikrishna Patwardhan, Pune (IN); Bart A. Giordano, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 453 days.

(21) Appl. No.: 12/752,947

(22) Filed: Apr. 1, 2010

Related U.S. Application Data

(60) Provisional application No. 61/175,534, filed on May 5, 2009.

(51) Int. Cl.
*H04Q 1/00* (2006.01)

(52) U.S. Cl.
USPC .......................................... 370/328; 370/315

(58) Field of Classification Search
USPC ................. 370/315, 327, 328, 338, 462, 463; 455/11.1, 15, 16, 41.2, 422.1, 426.1, 455/426.2
See application file for complete search history.

(56) References Cited

U.S. PATENT DOCUMENTS

| 6,930,987 B1 * | 8/2005 | Fukuda et al. ................. 370/328 |
| 2004/0081129 A1 * | 4/2004 | Haller et al. ................... 370/338 |
| 2008/0039102 A1 * | 2/2008 | Sewall et al. ................. 455/445 |
| 2009/0196163 A1 | 8/2009 | Du |
| 2010/0138549 A1 | 6/2010 | Goel et al. |

OTHER PUBLICATIONS

International Standard, ISO/IEC 8802-11, ANSI/IEEE Std 802.11, "Information technology—Telecommuncations and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.* (1999).

IEEE Std 802.11a-1999 (Supplement to IEEE Std 802.11-1999) "Supplement to IEEE Standard for Information technology—Telecommunications and informatino exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, 91 pages (1999).

(Continued)

*Primary Examiner* — Thai Nguyen

(57) ABSTRACT

A wireless access point includes a wireless communication module to establish a wireless connection with a first station; a first processing unit to perform a network function in a first basic service set (BSS) including the wireless access point and the first station; and a first connector to removably mate with a second connector, where a device separate from the wireless access point is (i) coupled to the second connector and (ii) has a second processing unit and a power source, where the first processing unit of the wireless access point is directly powered by the power source via the first connector and the second connector.

16 Claims, 7 Drawing Sheets

(56) References Cited

OTHER PUBLICATIONS

IEEE Std 802.11a-1999 (R2003) (Supplement to IEEE Std 802.11-1999) "Supplement to IEEE Standard for Information technology—Telecommunications and informatino exchange between systems—Local and metropolitan area networks—Specific requirements—Part 11: Wireless LAN Medium Access Control (MAC) and Physical Layer (PHY) specificaitons: High-Speed Physical Layer in the 5 GHZ Band, " *The Institute of Electrical and Electronics Engineers, Inc.* (1999) Reaffirmed Jun. 12, 2003.

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-Speed Physical Layer in the 2.4 GHZ Band," *The Institute of Electrical and Electronics Engineers, Inc.*, 1999.

IEEE Std 802.11b-1999/Cor 1-2001 (Corrigendum to IEEE Std 802.11b, 1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications: Amendment 2: Higher-Speed Physical Layer (PHY) in the 2.4 GHz band—Corrigendum 1," *The Institute of Electrical and Electronics Engineers, Inc.*, 23 pages, Nov. 7, 2001.

IEEE Std 802.11g/D2.8, May 2002 (Supplement to ANSI/IEEE Std 802.11, 1999 Edition) "Draft Supplement to Standard [for ] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, May 2002.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, 69 pages, Apr. 2003.

IEEE Std P802.11REVma/06.0, "Unapproved Draft Standard for Information Tedchnology—Telecommuncations and information exchange between systems—Local and metropolitan area networks—Specific requirements Part 11: Wireless LAN Medium Access Control (MAC) and Physical Layer (PHY) specifications: (This document reflects the combining of the 2003 Edition of 802.11 plus the 802.11 g, 802.11 i and 802.11j Amendments) (Revision of IEEE Std 802.11-1999) (Superseded by P802.11-REVma_D7.0)," 2006.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

Chen, "Home Network Basis: Transmission Environments and Wired/Wireless Protocols," Prentice Hall (Jul. 2003).

Hiertz, et al., "The IEEE 802.11 Universe," IEEE Communications Magazine, pp. 62-70, Jan. 2010.

S. A. Mujtaba, "IEEE P802.11—Wireless LANs, TGn Sync Proposal Technical Specification," *The Institute of Electrical and Electronics Engineers, Inc.*, doc.: IEEE 802.11—04/0889r6, May 2005.

"IEEE P802.11nTM/D3.00, Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11n$^{TM}$ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

van Nee, et al. "The 802.11n MIMO-OFDM Standard for Wireless LAN and Beyond," Wireless Personal Communications, vol. 37, pp. 445-453 (Jun. 2006).

U.S. Appl. No. 61/118,727, entitled "Portable AP Enhancements," filed Dec. 1, 2008.

U.S. Appl. No. 61/243,077, entitled "AP PS Enhancements," filed Sep. 16, 2009.

Draft P802.15.3/D0.2 "Information technology—Telecommunications and information exchange between systems—Local and metropolitan area networks—Specific requirements—Part 15.3: High Rate Wireless Personal Area Networks Medium Access Control (MAC) and Physical Layer (PHY) Specifications for High Rate Wireless Personal Area Networks (WPANs)," *The Institute of Electrical and Electronics Engineers, Inc.* (2001).

IEEE Std 802.15.3$^{TM}$ "IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs)," *The Institute of Electrical and Electronics Engineers, Inc.* (Sep. 29, 2003).

Abstract of M.P. Wylie-Green et al., "Multi-band OFDM UWB solution for IEEE 802.15.3a WPANs," 2005 IEEE/Sarnoff Symposium on Advances in Wired and Wireless Communication, pp. 102-105 (Apr. 2005).

IEEE Std 802.15.3c/D00 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.* (2008).

IEEE Std 802.15.3c/D07 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.* (2009).

\* cited by examiner

EMBEDDED ACCESS POINT

CROSS-REFERENCE TO RELATED APPLICATION

This application claims the benefit of U.S. Provisional Patent Application No. 61/175,534, entitled "AP Solution" which was filed on May 5, 2009, the entire disclosure of which is hereby incorporated by reference herein.

FIELD OF THE DISCLOSURE

The present disclosure relates generally to an access point for a wireless network, more particularly, to a low-power and small-footprint access point.

BACKGROUND

The background description provided herein is for the purpose of generally presenting the context of the disclosure. Unless otherwise indicated herein, the approaches described in this section are not prior art to the claims in this application and are not admitted to be prior art by inclusion this section.

A wireless access point connects various wireless communication devices to a wireless network, and relays data to and/or from the associated wireless communication devices. For example, the wireless communication devices, such as, for example, computers, printers, data storage devices, audio/video devices, and/or the like, may be connected to an access point directly or indirectly, and may exchange data with each other. Thus, the wireless access point is a very popular choice for implementing a home wireless network.

Typically, a wireless access point is a stationary device that requires an external power source and therefore cannot be used when no power source is available. Moreover, to connect to a network via a stationary access point, a wireless device must be within a certain limited operational range of the wireless access point.

SUMMARY

In an embodiment, a wireless access point includes a wireless communication module to establish a wireless connection with a first station; a first processing unit to perform a network function in a first basic service set (BSS) including the wireless access point and the first station; and a first connector to removably mate with a second connector, where a device separate from the wireless access point is (i) coupled to the second connector and (ii) has a second processing unit and a power source, where the first processing unit of the wireless access point is directly powered by the power source via the first connector and the second connector.

In various implementations, one or more of the following features may be included. The device separate from the wireless access point operates as a host device, and the first processing unit communicates with the second processing unit via the first connector and the second connector. The power source includes a battery. The first connector includes one of a universal serial bus (USB) connector or a secure digital (SD) connector. The first processing unit performs at least one of authentication, encryption, and dynamic rate adaptation in connection with the first BSS. The wireless communication module is configured to establish a second wireless connection with a second station, where the first processing unit routes data between the first station and the second station without routing the data via the first connector. The wireless communication module is configured to establish a second wireless connection with a further access point so that the access point operates as a station in a second BSS including the access point and the further access point. The wireless access point includes a memory unit to buffer data received via the wireless communication module.

In another embodiment, a device includes a first processing unit; a power source; and an interface to communicate with an embedded access point, the embedded access point including a wireless communication module to establish a wireless connection with a station and a second processing unit to control a wireless network including the embedded access point and the station, where the embedded access point is directly powered by the power source via the interface.

In various implementations, one or more of the following features may be included. The embedded access point comprises a connector that is removably connectable with the interface. The device includes a second wireless communication module to communicate with a base station operating in a second wireless communication network, where the embedded access point is configured to communicate with the second wireless communication module via the interface. The wireless network including the embedded access point and the station is a wireless local area network, and the second wireless network is a mobile telephony network. The devices includes a first memory unit for use by the first processing unit, where the embedded access point includes a second memory unit to buffer data received via the wireless communication module. The second processing unit is configured to implement a TCP/IP stack in connection with the wireless network. The device includes a user interface to receive configuration commands related to the access point, where the first processing unit forwards the configuration commands to the second processing unit via the interface.

A method for operating an access point includes receiving power from a power supply of a host device via a first connector that removably connects with a second connector associated with the host device, where the host device includes a first processing unit powered by the power supply; directly powering a second processing unit of the access point with the power received via the first connector, the second processing unit being separate from the first processing unit; establishing a wireless connection with a station via a wireless communication module of the access point; and forming a BSS including the access point and the station.

In various implementations, one or more of the following features may be included. The access point is a first access point, the wireless connection is a first wireless connection, the BSS is a first BSS, and the method includes establishing a second wireless connection with a second access point via the wireless communication module, and causing the first access point to join a second BSS as a station, where the second BSS includes the first access point and the second access point. The method includes communicating via the first BSS and via the second BSS without powering down the first access point. The wireless connection is a first wireless connection and the station is a first station; and the method includes establishing a second wireless connection with a second station via the wireless communication module of the access point, where the BSS includes the first access point, the first station, and the second station; receiving a data unit, where the data unit travels from the first station to the second station; and routing the data unit to the second station without transmitting the data unit to the host via the first connector. The method includes receiving a data unit from the station, determining that the data unit is addressed to the host device or to a device external to the BSS, and forwarding the data unit to the host via the first connector, where the host operates in an external network.

DETAILED DESCRIPTION

Figure 1:
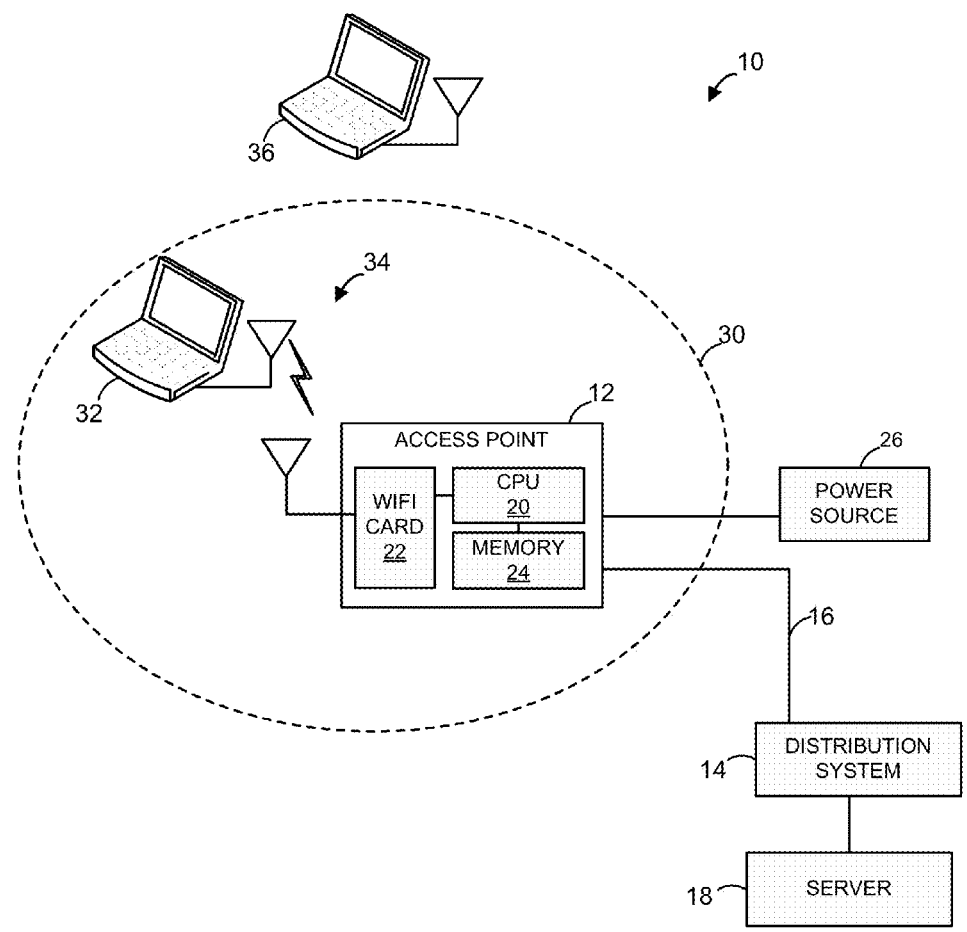
FIG. 1 is a block diagram of a communication system in which portable devices access a network via a stationary access point (AP)

FIG. 1 is a block diagram of a known communication network 10 in which a stationary access point (AP) 12 is connected to a distribution system 14 via a wired link 16. The distribution system 14 can be a wired local area network (LAN), for example, connected to a larger network such as the Internet (not shown) via a server 18. As is typical, the stationary AP 12 includes a central processing unit (CPU) 20 coupled to a Wi-Fi card 22 and a memory 24. The stationary AP 12 is also connected to a permanent power source 26.

As one of the conditions for establishing a communication link to the stationary AP 12 in order to access the server 18 or other network hosts, a device equipped with a wireless transceiver must be within the operating range 30 of the stationary AP 12. Thus, a personal computer 32 disposed within the range 30 and the stationary AP 12 can communicate and form a basic service set (BSS) 34 (i.e., an association of devices including an access point and at least one station). On the other hand, a personal computer 36 is disposed outside the range 30 and cannot establish a communication link with the stationary access point 12 to participate in the BSS 34. Similarly, if the personal computer 32 leaves the range 30, the communication link to the stationary AP 12 will be lost.

Figure 2:
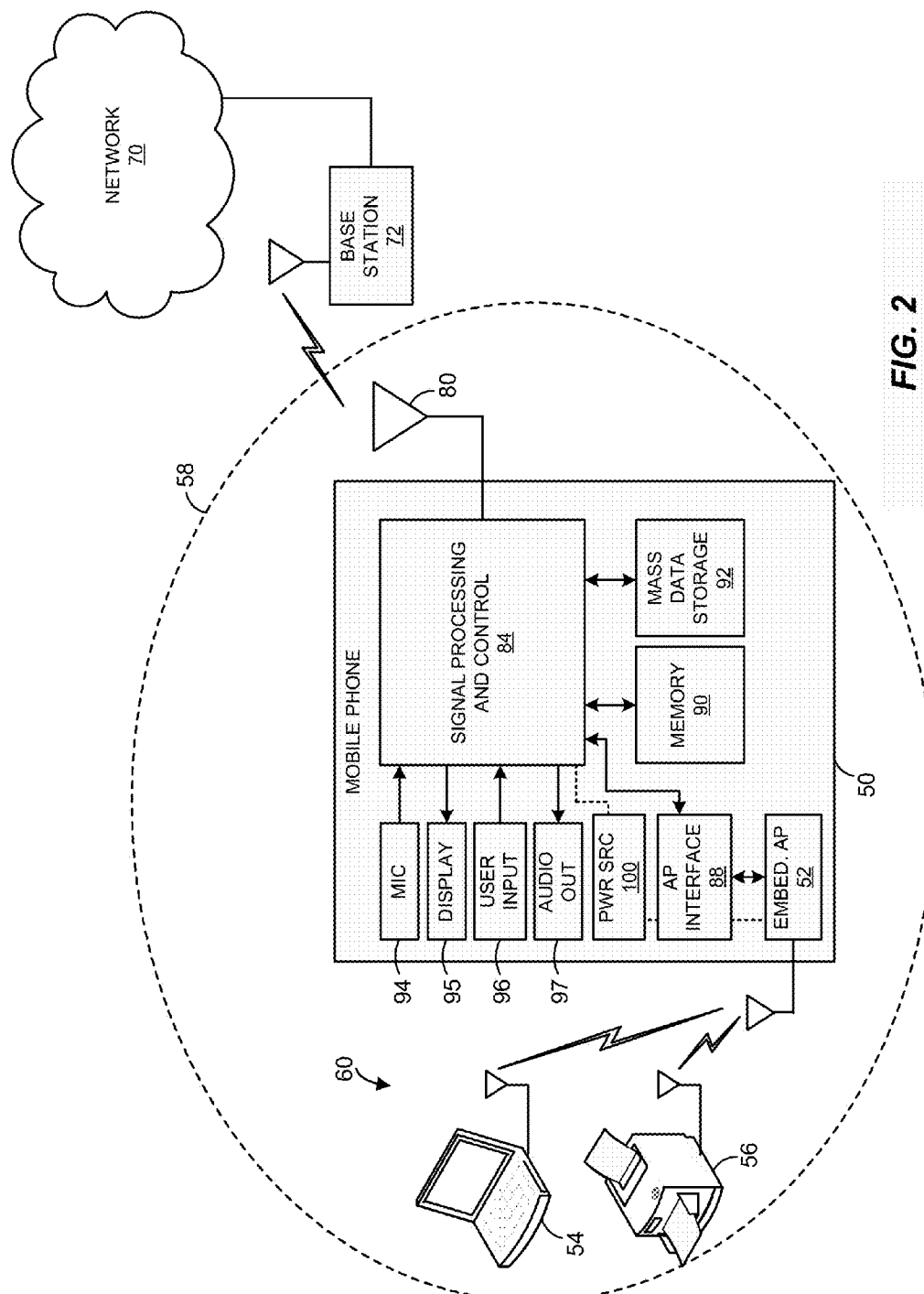
FIG. 2 is a block diagram of an example communication system in which a portable device utilizes an embedded AP to provide network access to another device in accordance with an embodiment of the present disclosure.

FIG. 2 is a diagram of an example communication network in which a mobile phone 50 is equipped with a compact, low code-footprint, low-power embedded AP module (hereinafter, "embedded AP") 52 to establish wireless communication links with devices 54 and 56 located within an operating range 58 of the embedded AP 52, and to form a BSS 60 that includes the embedded AP 52 and the devices 54 and 56. In an embodiment, the BSS 60 utilizes a wireless local area network (WLAN) communication protocol such as specified in the IEEE 802.11a, b, g, or n standards. The mobile phone 50 also operates in a mobile telephony network 70 that utilizes a mobile communication protocol such as the 3rd Generation (3G) family of standards defined by the International Telecommunication Union (ITU), a code divisional multiple access (CDMA) protocol, the Long Term Evolution (LTE) specification from the 3rd Generation Partnership Project (3GPP), or any suitable mobile communication protocol. To communicate with a base station 72 or other infrastructure elements associated with the network 70, the mobile phone 50 includes an antenna 80 coupled to a signal processing and control unit 84.

During operation, the embedded AP 52 operates independently of the signal processing and control unit 84 to control the operation of the BSS 60, which may include one or several stations wirelessly connected to the embedded AP 52. The embedded AP 52 implements the functionality of the stationary AP 12 illustrated in FIG. 1 as well as one or more (or none) of such features as efficient power management, station-specific rate adaptation, Wi-Fi and Bluetooth® coexistence support, etc., discussed in more detail below. The embedded AP 52 in effect provides a portable network cloud which wireless devices (e.g., laptops with wireless cards, wireless printers, personal digital assistants, etc.) can join to communicate with each other or with external hosts via the network 70. Thus, in one mode of operation, the embedded AP 52 routes or forwards data units between the devices 54 and 56. In another mode of operation, the embedded AP 52 routes or forwards data units between the device 54 or 56 and the network 70. Additional modes of operation of the embedded AP 52 and the mobile phone 50, as well as various topologies of the BSS 60 that the embedded AP 52 can support, are discussed in more detail with reference to FIGS. 5-8.

In general, the signal processing and control unit 84 implements the primary functionality of the mobile phone 50 (or a similar portable device) and can include a processor having an architecture suitable for low power applications, such as an Advanced RISC Machine (ARM) processor. In an embodiment, the signal processing and control unit 84 utilizes an operating system (OS) such as the Symbian OS, the QNX OS, or any other suitable operating system, to run drivers and applications. In an embodiment, because the embedded AP 52 includes an independent processing module such as a microprocessor or a processor embedded in an application-specific integrated circuit (ASIC), for example, the embedded AP 52 consumes few resources of the mobile phone 50, and does not require that the signal processing and control unit 84 implement AP-specific functionality. Rather, an AP interface 88 allows the embedded AP 52 and the signal processing and control unit 84 to exchange data and control information. In an embodiment, the AP interface 88 supports a standard application programming interface (API) function set to make the embedded AP 52 easily portable (i.e., easily incorporated into a variety of different mobile phones or other types of devices). In some embodiments, the AP interface 88 is compatible with the Secure Digital (SD) standard so that the embedded AP 52 is incorporated into an SD card and can be removably inserted into an SD connector of the mobile phone 50. In other embodiments, the AP interface 88 is a Universal Serial Port (USB) based interface, and the embedded AP 52 is provided in a separate external housing that is removably connectable to the mobile phone via a universal serial bus (USB) cable. Other suitable interfaces can also be used such as other industry standard interfaces, proprietary interfaces, etc.

In at least some of the embodiments, the AP interface 88 enables easy insertion and removal of the embedded AP 52 from the housing of the mobile phone 50. If implemented using a USB standard, in one embodiment, the AP interface 88 includes a female USB connector, and the embedded AP 52 includes a male USB connector. In another embodiment, the embedded AP 52 includes a female USB connector and a USB cable is utilized to couple the AP 52 with the AP interface 88. It is noted that in some embodiments, the AP interface 88 is also for coupling with devices other than the embedded AP 52, such as memory cards, power supplies, a personal computer, etc. Also in some embodiments in which the AP 52 includes a connector for removably connecting with other devices such as the mobile phone 50, the embedded AP 52 is similarly compatible with devices other than the mobile phone 50.

With continued reference to FIG. 2, the example mobile phone 50 includes a memory unit 90 (e.g., RAM) and a mass data storage 92 (e.g., a magnetic disk, a DVD drive), and several modules to provide user interaction: a microphone 94, a display 95, a user input device 96 (e.g., a keyboard, a keypad, a touch screen, etc.), and an audio output module 97 (e.g., a speaker). Further, a power source 100 such as a lithium battery or other suitable battery, provides power to both the embedded AP 52 and the signal processing and control unit 84. The AP interface 88 accordingly can provide power transfer functionality in addition to data transfer functionality. In an embodiment, the embedded AP 52 lacks a power source such as a battery that is sufficient to support all functionality of the embedded AP 52, and is therefore powered directly from the power source 100 via the AP interface 88. In other words, the embedded AP 52 includes either no power source or includes only a secondary power source that cannot support all transmitting, receiving, processing, etc. functions of the embedded AP 52. For example, the embedded AP 52 can include a battery for powering a battery backed-up memory. However, in some embodiments, the embedded AP 52 includes a power processing unit such as a DC-to-DC converter to adjust the voltage, amperage, frequency, or other characteristics of the supply signal provided via the AP interface 88. It is noted that the power source 100 in these embodiments does not supply a charging current to a battery of the embedded AP 52 that is sufficient to support all functions of the embedded AP 52. Thus, in these embodiments, the power source 100 is considered to directly power the embedded AP 52, albeit via a power processing circuit if included.

In addition to the mobile phone 50, the embedded AP 52 can be used with any electronic device. Moreover, it is noted that the electronic device need not operate in a network, and that the embedded AP 52 can be used to connect several devices in a local network without providing access to the Internet or other external network.

Figure 9:
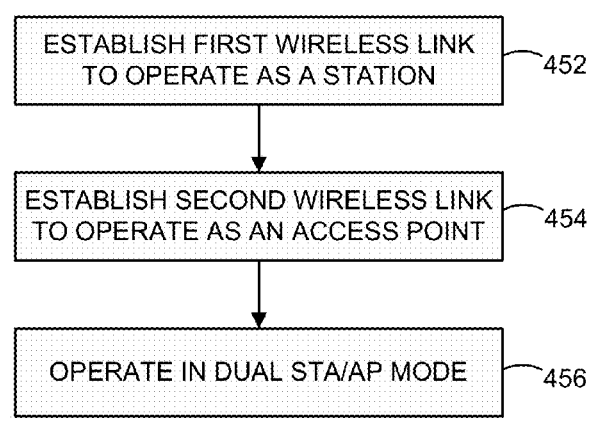
FIG. 9 is a flow diagram of an example method for configuring a device to operate as a station in a first communication network and as an access point in a second communication network using an embedded AP in accordance with an embodiment of the present disclosure.
Figure 10:
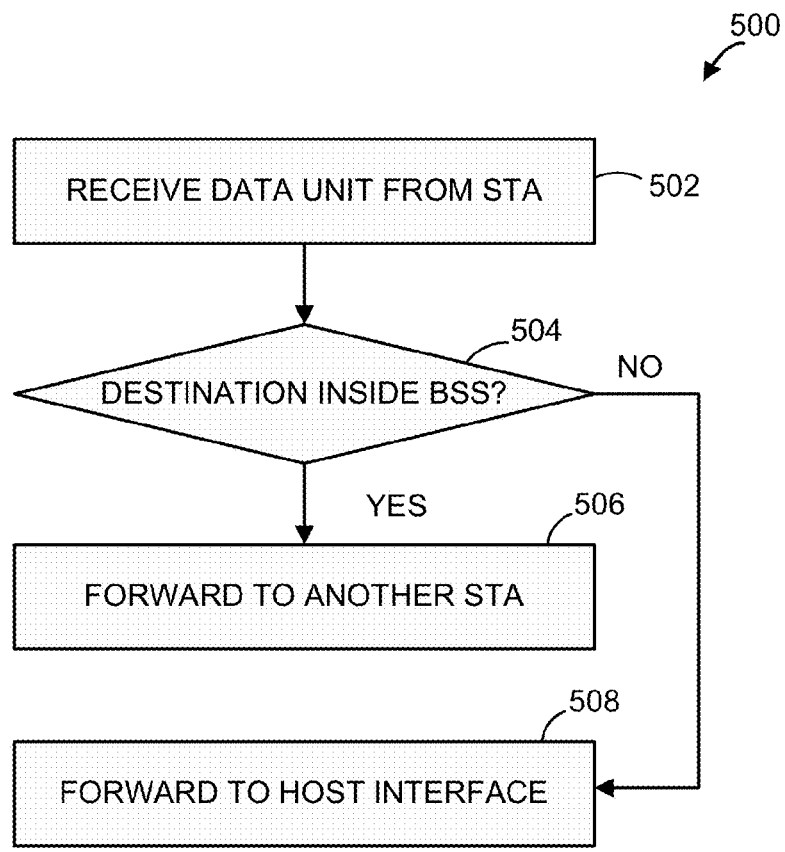
FIG. 10 is a flow diagram of an example method for routing data units between stations using an embedded AP in accordance with an embodiment of the present disclosure.

Next, an example embedded AP 120 is discussed with reference to FIG. 3, followed by a discussion of an AP controller that can be used in the embedded AP 120 or the embedded AP 52 with reference FIG. 4. FIGS. 5-8 then illustrate several example BSS topologies in which the embedded AP 52 or 120 can be used. Finally, FIGS. 9 and 10 illustrate example methods for configuring a device to operate in a dual BSS mode and routing data units between stations using an embedded AP, respectively.

Figure 3:
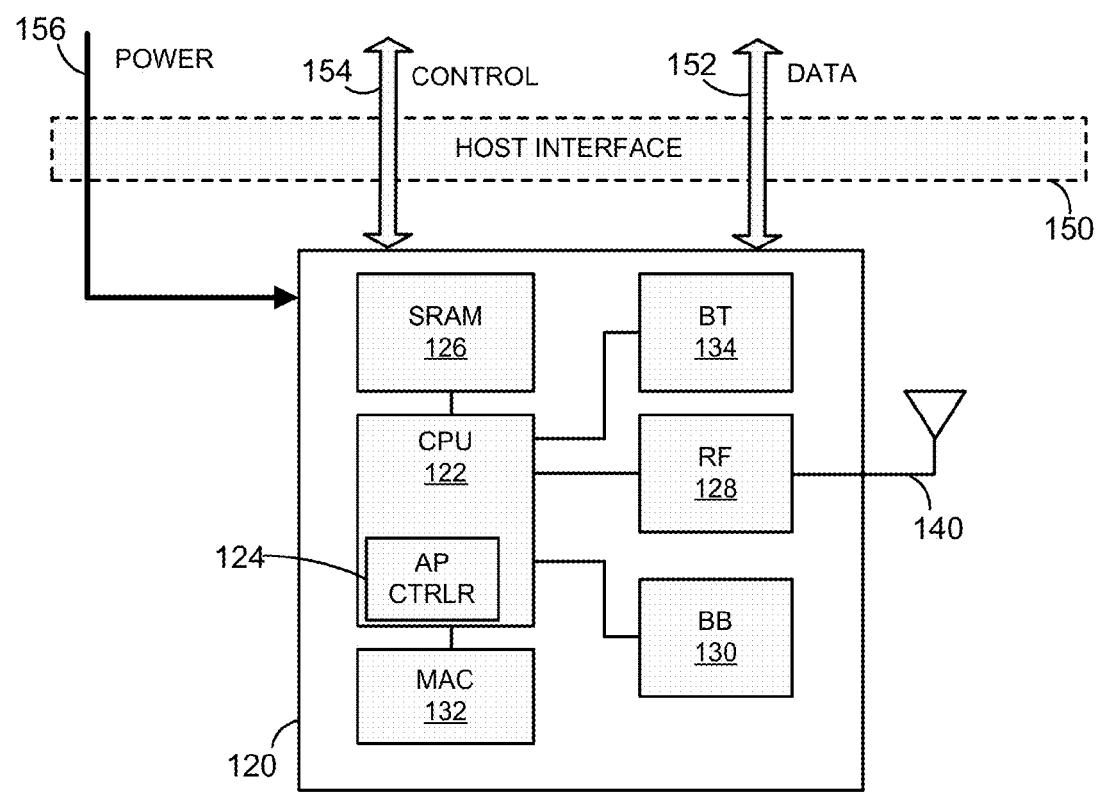
FIG. 3 is a block diagram of an example portable device equipped with an embedded AP that can be used in the communication system of FIG. 2.

Similar to the embedded AP 52, the embedded AP 120 illustrated in FIG. 3 can be used with the mobile phone 50 or another electronic device. In an embodiment, the embedded AP 120 is based on a Marvell 8688 chipset. The embedded AP 120 includes a processing unit 122 that can be, for example, an ARM processor. The processing unit 122 implements an AP controller 124, one example of which is discussed with reference to FIG. 4. The processing unit 122 is coupled to a static random access memory (SRAM) unit 126, an RF module 128, a baseband module 130, a media access control (MAC) unit 132, and a Bluetooth (BT) unit 134.

As illustrated in FIG. 3, the RF module 128 is coupled to an antenna 140. In general, the RF module 128 can implement any desired wireless technology such as one or several standardized communication protocols including, for example, the IEEE Standard 802.11a and its updates and amendments, the IEEE Standard 802.11b, the IEEE Standard 802.11g, the IEEE Standard 802.11n, and the IEEE draft standards 802.15.3 or 802.15.3c. To operate according to one or several of these standards, the RF module 128 can include one or several encoders and decoders, interleavers and de-interleavers, modulators and demodulators, digital-to-analog and analog-to-digital converters, and other components used in an RF communication path.

The embedded AP 120 receives data, control signals, and power via a host interface 150 that can be similar to or compatible with the AP interface 88 discussed above. In particular, the host interface 150 can include a set of electrical connectors to support power and data transfer, and a housing component to mate with a corresponding interface component of the device. As one example, the host interface 150 can include a male USB connector insertable into a female USB connector provided on the AP interface 88. Using a data channel 152, the embedded AP 120 exchanges data units (e.g., packets, frames, streams) with a host that utilizes the embedded AP 120. A control channel 154 carries configuration commands and other information to ensure interoperability between the embedded AP 120 and the corresponding host. On a portable device, a user can enter configuration data related to the embedded AP 120 using a user interface of the portable device (e.g., the display 95 and the user input module 96 illustrated in FIG. 2), and the portable device can in turn forward configuration commands to the embedded AP 120 via the control channel 154. Further, a power channel 156 provides a relatively small electrical signal to power the CPU 122 and other modules of the embedded AP 120. In one embodiment, the power channel 156 directly powers the CPU 122. In another embodiment, the power channel 156 directly powers the RF module 128. In yet another embodiment, the power channel 156 directly powers the CPU 122 and the RF module 128. It is noted that because the embedded AP 120 does not require an external user interface such as the modules 94-97 of FIG. 2, the embedded AP 120 can be configured to utilize very little power from the power source of the host device.

Moreover, in an embodiment, the embedded AP 120 is configured to further reduce power consumption by implementing power saving techniques such as those described in co-pending U.S. patent application Ser. No. 12/435,871, filed on May 5, 2009, and entitled "Access Point Enhancements," and in U.S. Provisional Patent Application No. 61/118,727, entitled "Portable AP Enhancements" which was filed on Dec. 1, 2008, both of which are incorporated herein by reference in their entireties. As one example, the embedded AP 120 powers down for small periods of time without disconnecting from stations participating in a BSS. In an embodiment, the embedded AP 120 powers down according to a schedule of communication timeslots, so that the RF module 128 receives or transmits data only when the embedded AP 120 is scheduled to participate in a timeslot (or potentially can participate in a contention-period timeslot).

In an embodiment, the BT module 134 is for establishing Bluetooth communication links with external devices. The AP controller 124 ensures that Wi-Fi and BT properly coexist in the embedded AP 120. In particular, the AP controller 124 allows Wi-Fi traffic (e.g., data being downloaded from the Internet to a laptop via the mobile phone 50) and Bluetooth traffic (e.g., a streaming music file being downloaded from the Internet, played by the mobile phone 50, and transmitted to a headset) to share a common channel with no adverse effect on each other. In some embodiments, the AP controller 124 can implement the techniques described in U.S. Provisional Patent Application No. 61/243,077, entitled "AP PS Enhancements" filed on Sep. 16, 2009, the entire disclosure of which is incorporated herein by reference.

Figure 4:
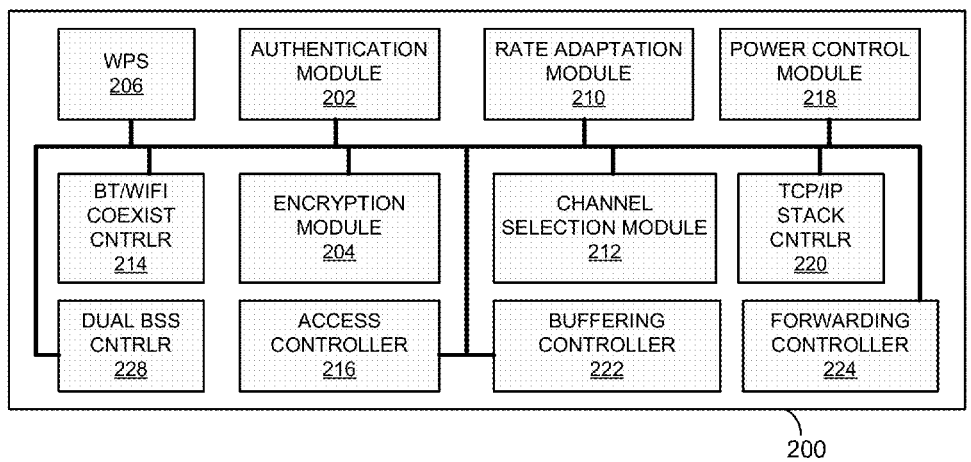
FIG. 4 is a block diagram of an example AP controller that can be used in the embedded AP of FIG. 2 or FIG. 3.

FIG. 4 is a block diagram of an embodiment of an AP controller 200 that can be used in the embedded AP 52 or 120 to implement functionality such as one or more of as rate adaptation, channel selection, access control including encryption and authentication, as well as TCP/IP stack support and various IP applications to provide advanced routing and network capability to the embedded AP 52 or 120. Depending on the particular embodiment, the components of the AP controller 200 can be implemented utilizing hardware, a processor executing firmware instructions, a processor executing software instructions, or any combination thereof. In an embodiment, the components of the AP controller 200 are provided as computer-executable instructions on a computer-readable memory such as a CD-ROM (or any other type of carrier) or made available for download from a host disposed on the Internet and/or via a mobile telephony network. Further, an AP controller 200, in some embodiments, includes only some of the components illustrated in FIG. 4 and/or includes components in addition to those illustrated in FIG. 4.

The AP controller 200 includes an authentication module 202 and an encryption module 204 to support secure authorized access to the corresponding one or several BSS clouds. In an embodiment, the encryption module 204 supports one or several of the Wireless Encryption Protocol (WEP), the Wi-Fi Protected Access (WPA), WPA2, the WLAN Authentication and Privacy Infrastructure (WAPI), etc., with open system authentication, pre-shared key (PSK), the IEEE 802.1x Standard for port-based network access control, etc. To facilitate configuration, the AP controller 200 further includes a Wi-Fi Protected Setup (WPS) module 206.

The AP controller 200 further includes a rate adaptation module 210 to support link-specific data rates to provide efficient throughput on each link Referring back to FIG. 2, in an embodiment, the rate adaptation module 210 configures the link between the embedded AP 52 and the device 54 to have one data rate, and the link between the embedded AP 52 and the device 56 to have another data rate. The data rate on each of these links may depend on the required quality of service and/or on physical conditions on each link.

With continued reference to FIG. 4, a channel selection module 212 evaluates several wireless channels to select the least congested channel. To this end, the channel selection module 212 can use any suitable techniques, including those known in the art. In an embodiment, a BT/Wi-Fi coexistence controller 214 ensures that a device using the embedded AP 52 or 120 can concurrently carry out Wi-Fi and BT operations, as discussed above with reference to FIG. 3. Still further, an access controller 216 implements a suitable access control mechanism to selectively allow or deny access to the corresponding BSS. For example, in an embodiment, the access controller 216 grants or denies access to each of the devices 54, 56 based on device identity, device type, or any other parameter (which may be user-configurable). Also, a power control module 218 implements power management logic as discussed above.

A TCP/IP stack controller 220 supports one or several network protocol layers (e.g., IP, TCP, UDP, etc.) to route data between stations operating in the BSS with which the corresponding embedded AP is associated, and support certain network functionality without relying on the host that includes the embedded AP. It is noted that the TCP/IP stack controller 220 allows the host (e.g., the mobile phone 50) to execute host-specific applications without needing to utilize its processing power for TCP/IP stack control functions. In an embodiment, the TCP/IP stack controller 220 also supports HTTP and/or HTTPS so that the embedded AP can run a web server, for example. In this embodiment, a user can configure the embedded AP using a standard web browser.

A buffering controller 222 allows the embedded AP 52 or 120 to buffer data using the SRAM unit 126 (see FIG. 3) when appropriate. For example, when the embedded AP 52 or 120 routes data between the devices 54 and 56 (see FIG. 2), the embedded AP 52 and 120 need not transfer data units via the host interface 150 and can instead utilize local resources. It is noted that the buffering controller 222 and the SRAM unit 126 permit the host device to preserve both space and processing power that would otherwise need to be dedicated for data units being transferred between the devices 54 and 56. Additionally or alternatively, the buffering controller 222 can also support a configuration option to route data packets to the memory of the host via the host interface 150. Referring back to FIG. 2, a user can thus choose to always route data, including data internal to the BSS 60, via the mobile phone 50 for the purposes of monitoring network traffic, for example.

Referring again to FIG. 4, a forwarding controller 224 implements at least some of the routing and forwarding functionality discussed above, in an embodiment. In this embodiment, the forwarding controller 224 determines that a data unit such as an Ethernet packet traveling from the device 54 to the device 56 illustrated in FIG. 2 can be routed locally, i.e., within the BSS 60. Accordingly, the forwarding controller 224 buffers the data packet using the buffering controller 222 and the SRAM unit 126 (see FIG. 3) and routes the data packet via the RF module 128 and the antenna 140. In at least some of the embodiments, the forwarding controller 224 processes the data packet without waking up the host. On the other hand, if the data packet is addressed to the host (e.g., the mobile phone 50) or a host on the Internet, the forwarding controller 224 forwards the data packet to the host via the host interface 150 to be consumed by the host or forwarded to the network 70.

With continued reference to FIG. 4, a dual BSS mode controller 228 allows the corresponding embedded AP to participate in multiple BSS clouds. For example, in one embodiment, the embedded AP is adapted to operate as a station in one BSS and as AP in another BSS, when desirable. In at least some of the embodiments, the embedded AP is adapted to participate in multiple BSS clouds concurrently, when desirable. The BSS mode controller 228 controls the timing of context switching of the AP controller 200, i.e., transitioning from one mode of operation to another mode of operation. Thus, the BSS mode controller 228 does not require that the embedded AP be power-cycled to transition between different modes of operation, in an embodiment. The BSS mode controller 228 also stores the BSS identity of the AP controller 200 for each BSS context. Dual mode of operation (i.e., operating as an AP in one BSS and a station in another BSS, concurrently) is further discussed below with reference to FIG. 6.

From the foregoing, it is noted that embedded AP 52 or 120 is configured to operate as a portable access point, and allows a portable device such as a mobile phone to provide a mobile Wi-Fi cloud. In one embodiment, the embedded AP 52 or 120 has a low code footprint because the AP controller 200 is dedicated specifically to AP functionality. Further, in an embodiment, the embedded AP 52 or 120 is constructed with a small form-factor convenient for packaging in a small form factor because the embedded AP 52 or 120 does not require a dedicated power source or user interface devices such as a display, a keypad, or even a button. In an embodiment, the embedded AP 52 or 120 is packaged in a USB pen-drive form factor. Still further, in an embodiment, the embedded AP 52 or 120 consumes little power during operation, and can be configured to sleep when not in service.

Figure 5:
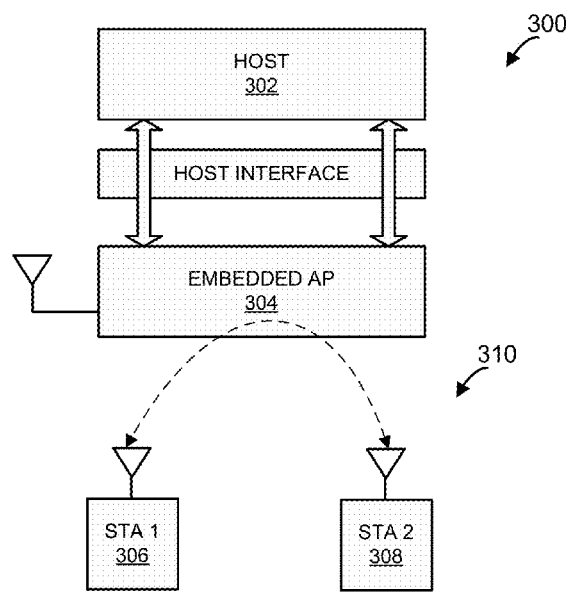
FIG. 5 is a block diagram of an example communication system in which a portable device that utilizes an embedded AP, consistent with an embodiment of the present disclosure, to route data between two stations.

FIG. 5 is a block diagram of an example a communication system 300 that includes a host 302 equipped and an embedded AP 304, which may be similar to the embedded AP 52 or 120. The system 300 also includes stations 306 and 308 equipped with respective transceivers and able to communicate in a Wi-Fi network in which the embedded AP functions as an access point. The embedded AP 304 and the stations 306 and 308 form a BSS 310. In this example configuration, the embedded AP 304 routes data between the stations 306 and 308 or, in some cases, between the host 302 and the station 306 or 308. The topology illustrated in FIG. 5 can be used to interconnect devices such as laptop computers, personal digital assistants, mobile phones, etc., operating as the stations 306 and 308, for example. To continue with this example, the host 302 is any suitable electronic device such as a mobile phone, a camera, a printer, an audio player, a video player, a personal computer, a laptop computer, etc.

Figure 6:
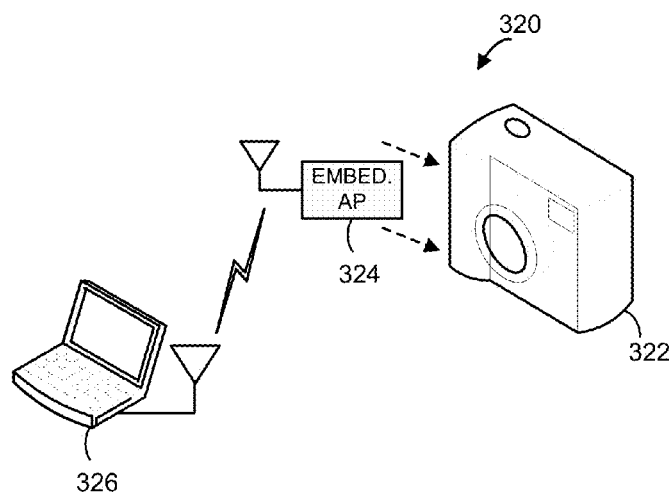
FIG. 6 is a block diagram of an example communication system in which a camera utilizes an embedded AP, consistent with an embodiment of the present disclosure, to share content with a portable station.

FIG. 6 illustrates an example communication system 320 in which a camera 322 uses an embedded AP 324 to connect to a computer host (e.g., a laptop computer) 326. The computer host 326 in this example is configured to operate as a station, and the embedded AP 324 operates as an access point so that the computer host 326 and the embedded AP 324 form a BSS. Once the communication link is established, the camera 322 can transfer picture files and other data to the computer host 326 or vice versa.

Figure 7:
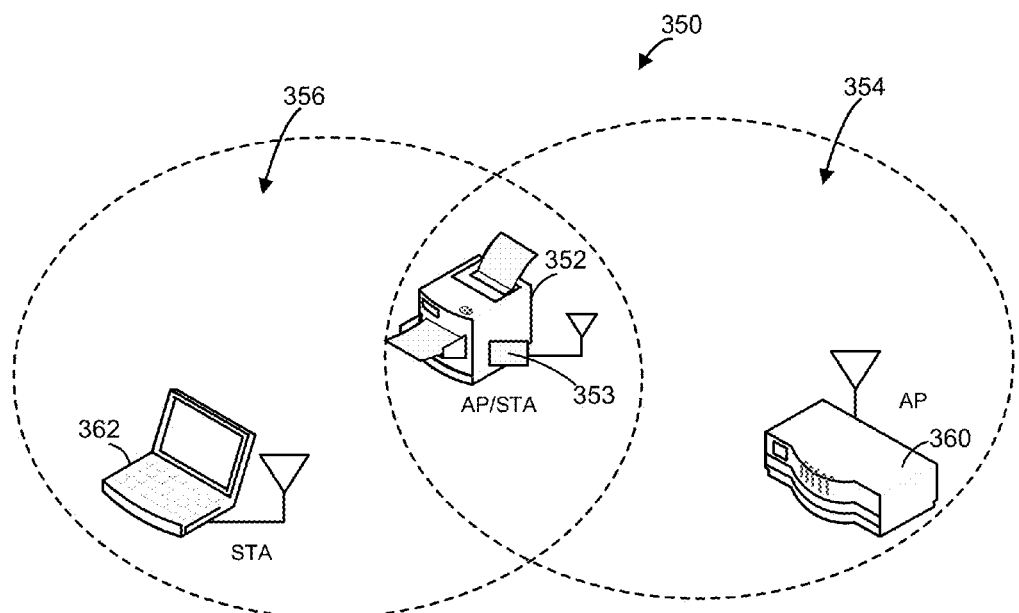
FIG. 7 is a block diagram of an example communication system in which a printer utilizes an embedded AP, consistent with an embodiment of the present disclosure, to operate as a station in one wireless network and as an AP in another wireless network.

FIG. 7 illustrates an example communication system 350 that includes a printer 352 with an embedded AP 353 that operates as a station in a BSS 354 and as an AP a BSS 356. For example, a wireless router 360 serves as an AP to the printer 352 as well as one or several computers (not shown). In an example, the wireless router 360 is located in a home or business and a portable computer 362 (or a camera or some other suitable electronic device) belongs to a guest who wishes to send a document to the printer 352. Rather than configuring the portable computer 362 with the information necessary for connecting to the BSS 354 (e.g., network name, security key), the embedded AP 353 can accept guest stations into the BSS 356 and allow guests to use the printing functionality of the printer 352 without allowing the guests to access any other portion of the home network. It is also noted that when a guest wishes to send a file to the printer 352 from a portable camera, for example, configuring the portable camera to participate in the home network is even more difficult, thus making the dual BSS mode of operation of the embedded AP 353 even more preferable. As discussed above with reference to FIG. 4, a component such as the dual BSS mode controller 228 can control access to the primary device (i.e., the printer 352) from each BSS, store network identifiers of the embedded AP 353 for each BSS, etc.

Figure 8:
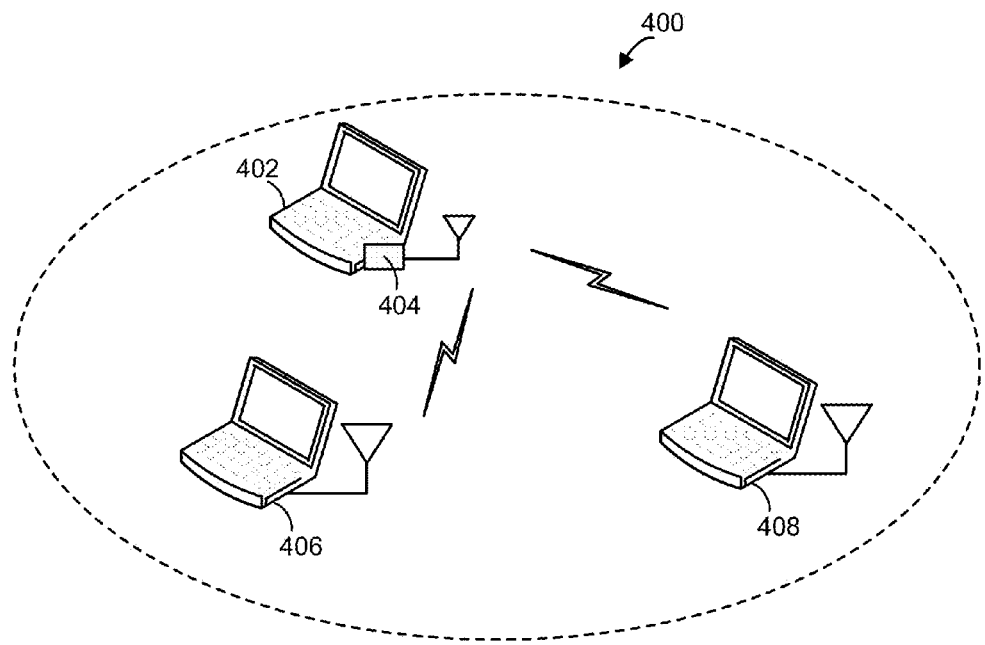
FIG. 8 is a block diagram of an example communication system in which an example embedded AP is utilized to form a wireless network for a gaming application.

FIG. 8 illustrates an example communication network 400 that is used for running a multi-player gaming application, for example. A personal computer 402 includes an embedded AP 404 that operates as an AP and supports communication with personal computers 406 and 408 operating as stations. According to this network topology, each of the computers 402, 406, and 408 originates and receives data packets. In an embodiment, the embedded AP 404 can route data packets exchanged by the computers 406 and 408 via the computer 402. In another embodiment, the embedded AP 404 determines, for each data packet, whether the data packet can be routed directly in the manner illustrated in FIG. 5, or whether the data packet should be forwarded to the computer 402. Generally speaking, gaming devices, mobile phones such as smartphones, laptop computers, or any other Wi-Fi clients can form a BSS having the topology illustrated in FIG. 8.

Of course, a device can also use an embedded AP such as the embedded AP 52 or 120 to operate in multiple modes. For example, a embedded AP laptop computer can operate the embedded AP similar to host 302 illustrated in FIG. 5 for one application, and similar to the personal computer 402 illustrated in FIG. 8 for another application. As another example, a mobile phone can utilize an embedded AP for "tethering," i.e., connecting one or several computers to a network such as the Internet, and using the embedded AP as a modem. At other times, the same mobile phone can be used to set up a BSS similar to the BSS 310 illustrated in FIG. 5.

FIG. 9 is a flow diagram of an example method 450 for configuring a device to operate as a station in a first communication network and as an access point in a second communication network using the embedded AP. An embedded AP such as the embedded AP 353, for example, can implement the method 450 to allow the corresponding host device (e.g., the printer 352) to participate in more than one BSS. In an embodiment, the embedded AP includes an AP controller with a dual BSS mode controller that controls the configuration parameters for each BSS and context switching between the BSSs. At block 452, a link to a wireless AP is established and the embedded AP obtains network parameters related to a first BSS in which the embedded AP is a station. Next, at block 454, a link to another device is established and the embedded AP provides network parameters related to a second BSS to the other device. The embedded AP operates as an AP in the second BSS. Finally, at block 456, the embedded AP begins to operate in the dual mode according to any suitable schedule or scheme.

FIG. 10 is a flow diagram of an example method 500 to route data units between stations in a WLAN. An embedded AP such as the embedded AP 52 120 can implement the method 500. In block 502, a data unit is received via the antenna 140 and the RF module 128, for example. The destination of the data unit is determined in block 504. If the destination is another station inside the BSS in which the embedded AP operates as an AP, the data unit is forwarded to the target station (block 506). Otherwise, if at block 504 it is determined that the destination is outside the BSS or if the destination is the host, the data unit is forwarded to the host interface such as the AP interface 88 or the host interface 150, for example. As discussed above, the host consumes the data packet if the host is the final destination of the data packet. Alternatively, in those embodiments where the host is connected to another network such as the Internet, the host forwards the data unit to the appropriate infrastructure element if the data unit is not intended for the host (e.g., the base station 72).

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored on any computer readable medium such as on a magnetic disk, an optical disk, or other storage medium, in a RAM or ROM or flash memory, processor, hard disk drive, optical disk drive, tape drive, etc. Likewise, the software or firmware instructions for the AP controller 200 or another component discussed above may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A wireless access point comprising:
a wireless communication module to establish (i) a first wireless connection with a first station and (ii) a second wireless connection with a second station;
a first processing unit to perform a network function in a first basic service set (BSS), the first BSS including the wireless access point, the first station, and the second station; and
a first connector to removably mate with a second connector, wherein a device separate from the wireless access point (i) is coupled to the second connector and (ii) has a second processing unit and a power source,
wherein the first processing unit of the wireless access point (i) is directly powered by the power source via the first connector and the second connector and (ii) routes data between the first station and the second station without routing the data via the first connector, and
wherein the wireless communication module is configured to establish a third wireless connection with a further access point so that the wireless access point operates as a station in a second BSS including the wireless access point and the further access point.

2. The wireless access point of claim 1, wherein the device separate from the wireless access point operates as a host device, and wherein the first processing unit communicates with the second processing unit via the first connector and the second connector.

3. The wireless access point of claim 2, wherein the power source comprises a battery.

4. The wireless access point of claim 1, wherein the first connector comprises one of a universal serial bus (USB) connector or a secure digital (SD) connector.

5. The wireless access point of claim 1, wherein the first processing unit performs at least one of authentication, encryption, and dynamic rate adaptation in connection with the first BSS.

6. The wireless access point of claim 1, further comprising a memory unit to buffer data received via the wireless communication module.

7. A device comprising:
a first processing unit;
a power source; and
an interface to communicate with an embedded access point, the embedded access point including:
a wireless communication module to establish (i) a first wireless connection with a first station and (ii) a second wireless connection with a second station, and
a second processing unit to control a first wireless network including the embedded access point, the first station, and the second station,
wherein the embedded access point (i) is directly powered by the power source via the interface and (ii) routes data between the first station and the second station without routing the data via the interface, and
wherein the wireless communication module is configured to establish a third wireless connection with a further access point and the second processing unit is configured to control a second wireless network to operate the embedded access point as a station, wherein the second wireless network includes the embedded access point and the further access point.

8. The device of claim 7, wherein the embedded access point comprises a connector that is removably connectable with the interface.

9. The device of claim 7, wherein the device further includes a second wireless communication module to communicate with a base station operating in a third wireless network,
wherein the embedded access point is configured to communicate with the second wireless communication module via the interface.

10. The device of claim 9, wherein the first wireless network station is a wireless local area network, and the third wireless network is a mobile telephony network.

11. The device of claim 7, further comprising:
a first memory unit for use by the first processing unit,
wherein the embedded access point includes a second memory unit to buffer data (i) received via the wireless communication module and (ii) to be routed between the first station and the second station.

12. The device of claim 7, wherein the second processing unit is configured to implement a TCP/IP stack in connection with the first wireless network.

13. The device of claim 7, further comprising a user interface to receive configuration commands related to the embedded access point,
wherein the first processing unit forwards the configuration commands to the second processing unit via the interface.

14. A method for operating a first access point, the method comprising:
- receiving, at the first access point, power from a power supply of a host device via a first connector that removably connects with a second connector associated with the host device, wherein the host device includes a first processing unit powered by the power supply;
- directly powering a second processing unit of the first access point with the power received via the first connector, wherein the second processing unit is separate from the first processing unit;
- establishing (i) a first wireless connection with a first station and (ii) a second wireless connection with a second station via a wireless communication module of the first access point;
- forming a first basic service set (BSS) including the first access point, the first station, and the second station;
- receiving, with the wireless communication module of the first access point, a first data unit from the first station, wherein the first data unit is addressed to the second station;
- transmitting, with the communication module of the first access point, the first data unit to the second station without transmitting the first data unit to the host device via the first connectors;
- establishing a third wireless connection with a second access point via the wireless communication module of the first access point; and
- causing the first access point to join a second BSS as a station, wherein the second BSS includes the first access point and the second access point.

15. The method of claim 14, further comprising communicating via the first BSS and via the second BSS without powering down the first access point.

16. The method of claim 14, further comprising:
- receiving a second data unit from the first station wherein the second data unit is addressed to a device external to the first BSS; and
- forwarding the second data unit to the host device via the first connector, wherein the host device operates in an external network.

* * * * *